United States Patent [19]

Covey et al.

[11] 4,224,289

[45] Sep. 23, 1980

[54] ALKALI REGENERATION PROCESS

[75] Inventors: Geoffrey H. Covey, Eltham North; William H. Algar, Donvale, both of Australia

[73] Assignee: Australian Paper Manufacturers Limited, South Melbourne, Australia

[21] Appl. No.: 31,215

[22] Filed: Apr. 18, 1979

[30] Foreign Application Priority Data

Apr. 20, 1978 [AU] Australia .............................. PD4129
Nov. 16, 1978 [AU] Australia .............................. PD6798

[51] Int. Cl.$^3$ ....................... C01D 1/04; D21C 11/04
[52] U.S. Cl. ................................ 423/155; 162/30 R; 423/183; 423/207; 423/637; 423/641
[58] Field of Search ............... 423/155, 158, 164, 184, 423/198, 179, 183, 207, 659 F, DIG. 3; 162/30 R

[56] References Cited

U.S. PATENT DOCUMENTS

| 3,304,249 | 2/1967 | Katz | 423/659 F |
|---|---|---|---|
| 4,000,264 | 12/1976 | Nagano et al. | 423/183 |

*Primary Examiner*—Wayne A. Langel
*Attorney, Agent, or Firm*—Bucknam and Archer

[57] ABSTRACT

In the regeneration of alkaline liquors as used in paper pulping, a mixed oxide compound of an alkali or alkaline earth metal oxide and an oxide of Ti, Fe, Co, Ni, or Mn is formed by burning black liquor. The burning step is carried out in a fluidized bed. The mixed oxide product is washed in cold water and subsequently treated with hot water to precipitate the oxide of Ti, Fe, Co, Ni or Mn and enable recovery of the alkaline solution for recycling.

5 Claims, No Drawings

ALKALI REGENERATION PROCESS

This invention relates to a method of recovering alkali or alkaline earth metal oxides or hydroxides from spent solutions (particularly spent paper pulping liquors). This invention uses a method of recovering the alkali or alkaline earth metal oxides by adding to the spent liquor a transition metal oxide (preferably ferric oxide) then burning the solution. This reaction results in the formation of a mixed oxide. The mixed oxides to which this invention relates are those which are not hydrolysed or which are only slowly hydrolysed in cold water (or alkaline aqueous solution) but are more readily hydrolysed in hot water (or alkali aqueous solution) to form an alkaline or alkaline earth hydroxide (e.g. sodium ferrate $Na_2OFe_2O_3$ or $Na_2Fe_2O_4$).

These compounds have found use in the recycling of sodium hydroxide in industrial plants. In particular, one important application is described in Australian Patent Specification No. 486,132. This patent relates to the recovery of NaOH pulping liquor used in sulfur free soda pulping processes which produce paper pulps from wood and other lignocellulosic materials. The waste liquor from the pulping operation is concentrated mixed with ferric oxide and burnt in a furnace. It is suspected that $Na_2CO_3$ and $Na_2O$ present in the liquor combine with the ferric oxide to form sodium ferrate (also referred to as sodium ferrite or sodium iron oxide) as follows:

$$Na_2CO_3 + Fe_2O_3 \rightarrow Na_2Fe_2O_4 + CO_2$$

$$Na_2O + Fe_2O_3 \rightarrow Na_2Fe_2O_4$$

Sodium hydroxide is regenerated by immersing the sodium ferrate compound in hot water.

$$Na_2Fe_2O_4 + H_2O \rightarrow 2NaOH + Fe_2O_3$$

with removal of $Fe_2O_3$ as a precipitate.

As indicated above the process of this invention is primarily concerned with the regeneration of spent NaOH pulping liquors in paper making plants. The method is equally applicable to other pulping liquors which use KOH or $Ba(OH)_2$ as the main chemical and can be used for the regeneration of alkaline liquors in other processing plants such as for the regeneration of alkaline liquor used in the Bayer bauxite process. Unlike the prior art process described in patent No. 486,132 this method can be used with sulfur containing liquors although the alkali metal combined with the sulfur is removed in the cold water washing and is not regenerated.

The reaction of the alkaline or alkaline earth metal with the transition metal can be carried out according to the present invention in a fluidized bed.

Fluidized bed techniques have been used in the combustion of various types of spent pulping and/or bleaching liquors when ferric oxide is not added (see e.g. Copeland and Hanway TAPPI 47(6), 175A (June, 1964) and Kleinau: ATCP 14(6), 374).

Pure sodium carbonate melts at about 850° C. but the presence of impurities such as exist in the spent liquor lower its melting temperature. For the satisfactory operation of a fluidized bed it is generally considered to be essential to work below the temperature at which the bed material melts or becomes sticky otherwise the particles forming the fluidized bed agglomerate excessively and the equipment ceases to function. For this reason it is usual to operate these fluidized beds at temperatures of around 750° C., but at this temperature the organic portion of the spent liquor burns slowly and hence a large fluidized bed reactor is required. Further, operating conditions are critical and small changes in bed temperature can result in extinction of combustion or melting of the particles forming the bed. Another disadvantage is that the temperature of the gases leaving the reactor are too low for the economical recovery of the heat liberated during the combustion of the spent liquor.

When ferric oxide is added to the bed the problem is further complicated by the fact that a solid/solid reaction between the ferric oxide and the sodium carbonate (formed by the combustion of the spent liquor) is required so that it is considered desirable to use very fine oxide particles in order to maximize the surface area available for reaction and use the ferric oxide efficiently. However, these fine particles are readily carried from the bed by the fluidizing air so it is necessary to reduce the velocity of this air thus reducing the rate of combustion and so reducing the capacity of the fluidized bed reactor.

It has now been found that by operating the fluidized bed under conditions which have previously been considered as inoperable, reaction of the ferric oxide with the alkali or alkaline earth metal carbonate proceeds without any of the aforementioned difficulties.

To this end the present invention provides a method of recovering an alkali or alkaline earth metal oxide or hydroxide from a solution containing an alkali or alkaline earth metal carbonate, organic chemicals and impurities which comprises burning said solution in a fluidized bed of particles of an oxide of a transition metal selected from Ti, Fe, Co, Ni and Mn, and maintaining said fluidized bed at a temperature at which said alkali or alkaline earth metal carbonate becomes molten, subsequently recovering a mixed oxide compound from said fluidized bed, submerging said mixed oxide in hot water to form an alkaline or earth metal oxide or hydroxide and a precipitate of the transition metal oxide, subsequently separating said precipitate for recycling to said fluidized bed and recovering a solution of said alkali or alkaline earth metal oxide or hydroxide.

Contrary to what would be expected from the results of experiments with other systems (see e.g. the work of Copeland and Hanway and of Kleinau) it has been found that using the process of this invention spent soda pulping liquor can be burned in a fluidized bed of ferric oxide at temperatures above the melting point of the alkali or alkaline earth metal carbonate without causing excessive agglomeration of the particles forming the bed. The preferred temperature range within which the fluidized bed can be operated is 850° C. to 1100° C. and varies according to the alkali or alkaline earth metal used. Furthermore because the alkali or alkaline earth metal carbonate is molten it is able to penetrate the ferric oxide particles and so it is possible to form the fluidized bed using large particles and using high fluidizing velocities whilst maintaining efficient use of the ferric oxide.

The sodium ferrate produced is frequently contaminated with sodium chloride, sodium sulphate and various other materials which were present in the raw materials used in its manufacture. Chlorine will be introduced to the ferrite if effluent from bleaching of lignocellulosic materials is burned with the effluent from the pulping stage (this is done in some mills as a means of disposal). Sulphur is introduced to the ferrite if fuels containing sulfur (e.g. coal or oil) are burned in the system. Silicon enters the system with the lignocellulosic material, particularly when grasses and some other nonwoods are pulped.

If the sodium ferrate is hydrolysed with water to produce sodium hydroxide solution then certain of the contaminants will be dissolved and will adulterate the sodium hydroxide solution. In many circumstances this is undesirable as the contaminants may produce undesired effects in the process for which the solution is used or they may cause severe corrosion of equipment and in the case of pulping of lignocellulosic material, silicon and aluminium tend to cause scaling of heat transfer surfaces. Also, if the sodium hydroxide solution is repeatedly recycled after use, the levels of contaminants will tend to rise and if the concentrations of sodium chloride and/or sodium sulphate are sufficiently high they may interfere with the operation of the equipment in which the sodium ferrate is produced. In particular, certain low melting point compounds (notably chlorides and sulphates) are formed which may interfere with the proper operation of the furnace in which the ferric oxide and alkaline compound react. Furthermore, it is believed that certain contaminants (particularly sulphates) interfere with the reaction by which sodium ferrate is formed and thus reduce the recovery yield of sodium hydroxide and $Fe_2O_3$.

The existing method of removing sulphate and chloride from sodium hydroxide solutions is to concentrate the solution to such an extent that the sulphate and chloride crystallise and can be removed as solids. This method has the disadvantages of requiring expensive equipment and of needing large quantities of heat to evaporate the solution. Other contaminants (e.g. silicates, chromates) are removed by precipitation caused by the addition of suitable reagents (e.g. calcium hydroxide, barium chloride) but this method is costly and may be unacceptable if excess of the reagent used to cause precipitation cannot be tolerated.

To overcome the problems of contamination the mixed oxide product recovered from the fluidized bed is washed in cold water prior to its being subjected to the hot water submersion treatment.

The temperatures used for the cold and hot water treatments mentioned above depend on the mixed oxide being treated. The optimum temperature for its cold water stage for a particular mixed oxide is that at which the solubilities of the impurities to be removed are sufficiently high for them to be removed with an acceptably small volume of water whilst the water is not so hot that hydrolysis of the mixed oxide occurs to an unacceptable extent; e.g. for sodium ferrate the water should not be hotter than about 35° C.

The temperature for the hot water stage must be sufficiently high to ensure adequate hydrolysis of the mixed oxide in an acceptable time and can readily be determined for a particularly mixed oxide; e.g. for sodium ferrate the temperature of the water should not be less than about 70° C.

Where the process is concerned with regenerating sodium hydroxide and when sodium sulphate and sodium chloride are the main contaminants present in substantial quantities the method will reduce their concentration in the sodium hydroxide.

The method also reduces the concentration of other water soluble compounds which may be present (e.g. sodium chromate, sodium vanadate, sodium silicates).

The method is simple to operate, requires relatively inexpensive equipment, and does not consume large quantities of energy.

The results of tests in which spent liquor from the sodium hydroxide pulping of wood was burned at various temperatures in a fluidized bed of particles of ferric oxide of mean diameter of about 1 mm are shown in Table 1 (the same air rate was used in all cases).

TABLE 1

| Results of tests burning spent pulping liquor in a fluidized bed of ferric oxide | | | | |
|---|---|---|---|---|
| Temperature (°C.) | 700 | 800 | 900 | 1000 |
| Molar fraction of total sodium which has reacted. | 0.35 | 0.71 | 0.93 | 0.94 |

The advantages which can be gained by operating the fluidized bed at temperatures above the melting point of sodium carbonate include:

1. The sodium carbonate reacts more readily with the ferric oxide, therefore larger particles of ferric oxide can be used which permits the use of greater fluidizing velocities.
2. The organic portion of the black liquor burns more rapidly which, together with the increased fluidizing air rate, increases the capacity of the fluidized bed reactor.
3. The higher temperature of the gases leaving the reactor makes waste heat recovery economic.
4. At high temperatures the sodium carbonate reacts rapidly with the large particles of ferric oxide to form a granular material which shows little tendency to agglomerate. The nature of this material makes it feasible to place heat transfer surfaces within the fluidized bed and so further increase the thermal efficiency. Although the use of heat transfer surfaces within the bed is not novel (it has been used, for example, in fluidized bed, coal fired boilers) previous attempts to apply the technology to the combustion of waste pulping liquors have been largely unsuccessful because the agglomerative nature of the bed material generated by the conventional methods has caused operating difficulties.

Following the fluidized bed reaction the cold water washing treatment can be carried out as previously explained. The following examples illustrate the cold water washing treatment of this invention.

EXAMPLE 1

A mixture was made of 32.5 g of ferric oxide, 9.2 g of sodium carbonate and small quantities of compounds which might enter the recovery system of a pulp mill and which would tend to form compounds soluble in sodium hydroxide. The mixture was heated for three hours at 900° C., cooled to room temperature in a dessicator, stirred with 150 ml of water at 20° C. for 10 minutes, filtered and the solid residue stirred with 150 ml of water at 80° C. for 40 minutes and again filtered. The two filtrates were aanalysed and the results are given in Table 1.

EXAMPLE 2

A number of batches of a mixture of 20 g ferric oxide, 8 g of sodium carbonate, 2.2 g of sodium chloride and 2.84 g of sodium sulphate were heated for three hours at 850° C. and then cooled to room temperature in a dessicator. Each sample was then stirred with cold water and filtered, (the filtrate is the effluent from the process). The residue was then stirred with 150 ml of water at 80° C. for 30 minutes and filtered and washed. The results of these tests are shown in Tables 3, 4, and 5. The conditions of the first treatment with water of each sample were as shown in the respective Tables. Table 3 corresponds to stirring in 100 ml of water for 5 minutes at various temperatures. Table 4 corresponds to stirring in various volumes of water for 5 minutes at 20° C. Table 5 corresponds to stirring in 100 ml of water at 20° C. for various periods of time.

TABLE 2

| Element | Quantity in cold water filtrate (mg) | Quantity in hot water filtrate (mg) | % of soluble material removed in cold water filtrate |
| --- | --- | --- | --- |
| Al | 23 | 28 | 45.1 |
| Cr | 54 | 2.2 | 96.1 |
| K | 43 | 3.5 | 92.5 |
| Mo | 90 | 6.0 | 93.7 |
| Si | 10.7 | 5.8 | 64.8 |
| Sn | 6.2 | 8.0 | 43.7 |
| V | 113 | 7 | 94.1 |
| Anions | | | |
| $CO_3^{2-}$ | 187 | 79 | 70.3 |
| $OH^-$ | 80 | 1570 | 4.9 |
| $Cl^-$ | 480 | 24.2 | 95.2 |
| $SO_4^{2-}$ | 832 | 27 | 96.8 |

TABLE 3

| Temperature °C. | Percentage of each compound removed with the first filtrate | | | |
| --- | --- | --- | --- | --- |
| | NaOH | $Na_2CO_3$ | $Na_2SO_4$ | NaCl |
| 5 | 0.047 | 28.3 | 91.0 | 92.0 |
| 12 | 0.25 | 30.8 | 88.9 | 89.9 |
| 20 | 0.40 | 30.0 | 88.4 | 91.6 |
| 30 | 0.62 | 27.6 | 88.4 | 90.5 |
| 40 | 2.00 | 38.6 | 91.8 | 92.6 |
| 50 | 8.20 | 38.1 | 90.4 | 90.5 |
| 60 | 20.6 | 34.6 | 90.2 | 93.5 |
| 70 | 81.7 | 60.2 | 89.2 | 91.2 |

TABLE 4

| Volume of cold water used ml | Percentage of each compound removed with the first filtrate | | | |
| --- | --- | --- | --- | --- |
| | NaOH | $Na_2CO_3$ | $Na_2SO_4$ | NaCl |
| 25 | 0.19 | 42.9 | 60.7 | 63.9 |
| 50 | 0.20 | 33.9 | 81.4 | 83.3 |
| 100 | 0.40 | 30.0 | 88.4 | 91.6 |
| 200 | 0.62 | 36.6 | 87.8 | 94.4 |

TABLE 5

| Time for which sample was stirred with cold water. min | Percentage of each compound removed with the first filtrate | | | |
| --- | --- | --- | --- | --- |
| | NaOH | $Na_2CO_3$ | $Na_2SO_4$ | NaCl |
| 1 | 0.095 | 17.4 | 88.4 | 90.1 |
| 2 | 0.20 | 28.8 | 87.4 | 89.3 |
| 5 | 0.40 | 30.0 | 83.4 | 91.6 |
| 10 | 0.77 | 28.9 | 88.6 | 90.6 |
| 20 | 0.94 | 34.1 | 91.5 | 93.1 |

We claim:

1. A method of recovering an alkali or alkaline earth metal oxide or hydroxide from a solution containing an alkali or alkaline earth metal carbonate, organic chemicals and impurities which comprises burning said solution in a fluidized bed of particles of an oxide of a transition metal selected from Ti, Fe, Co, Ni and Mn, and maintaining said fluidized bed at a temperature at which said alkali or alkaline earth metal carbonate becomes molten, subsequently recovering a mixed oxide compound from said fluidized bed, submerging said mixed oxide in hot water at a temperature not lower than about 70° C. to form an alkali or alkaline earth metal oxide or hydroxide and a precipitate of the transition metal oxide, subsequently separating said precipitate for recycling to said fluidized bed and recovering a solution of said alkali or alkaline earth metal oxide or hydroxide.

2. A method as claimed in claim 1 wherein said mixed oxide compound is subjected to a washing treatment with water at a temperature not higher than about 35° C. prior to submersion in hot water.

3. A method as defined in claim 1 in which the alkali metal is sodium.

4. A method as claimed in claim 1 in which the transition metal oxide is ferric oxide.

5. A method as claimed in claim 1 in which the temperature of the fluidized bed is maintained within the range of 850° C. to 1100° C.

* * * * *

UNITED STATES PATENT AND TRADEMARK OFFICE
CERTIFICATE OF CORRECTION

PATENT NO. : 4,224,289
DATED : September 23, 1980
INVENTOR(S) : Geoffrey Harold Covey et al.

It is certified that error appears in the above—identified patent and that said Letters Patent is hereby corrected as shown below:

On The Title Page insert

-- (73) Assignee: Australian Paper Manufactuers Limited, South Melbourne, Australia and Toyo Pulp Company, Ltd., Tokyo, Japan --.

Signed and Sealed this

Third Day of March 1981

[SEAL]

Attest:

RENE D. TEGTMEYER

Attesting Officer

Acting Commissioner of Patents and Trademarks